United States Patent
Mangano et al.

(10) Patent No.: US 9,990,329 B2
(45) Date of Patent: Jun. 5, 2018

(54) INTERFACE FOR A COMMUNICATION DEVICE AND RELATED METHODS

(71) Applicant: STMICROELECTRONICS S.R.L., Agrate Brianza (IT)

(72) Inventors: Daniele Mangano, San Gregorio di Catania (IT); Riccardo Condorelli, Tremestieri Etneo/Catania (IT); Gaetano Distefano, San Pietro Clarenza (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 153 days.

(21) Appl. No.: 14/969,642

(22) Filed: Dec. 15, 2015

(65) Prior Publication Data

US 2016/0350258 A1    Dec. 1, 2016

(30) Foreign Application Priority Data

May 26, 2015   (IT) .................. 102015000017957

(51) Int. Cl.
G06F 13/42    (2006.01)
G06F 13/40    (2006.01)

(52) U.S. Cl.
CPC ...... *G06F 13/4282* (2013.01); *G06F 13/4027* (2013.01); *G06F 13/4291* (2013.01)

(58) Field of Classification Search
None
See application file for complete search history.

(56) References Cited

U.S. PATENT DOCUMENTS

2013/0297829 A1   11/2013   Berenbaum et al.
2014/0281651 A1   9/2014    Mangalindan

*Primary Examiner* — Farley Abad
*Assistant Examiner* — Dayton Lewis-Taylor
(74) *Attorney, Agent, or Firm* — Slater Matsil, LLP

(57) ABSTRACT

A method that is for operating a serial protocol interface includes a communication device that is configured to exchange data over a communication link by sending output data on the communication link, and receiving input data on the communication link. The input data is synchronous with a clock signal generated at the communication device and propagated over the communication link. The method also includes initializing operation by sending the output data on the communication link at a first data rate, detecting a signal transition in the input data received on the communication link, and exchanging data over the communication link at a second data rate when the signal transition is detected, the second data rate being higher than the first data, with the exchanging of data at the second data rate synchronized as a function of the signal transition.

20 Claims, 3 Drawing Sheets

INTERFACE FOR A COMMUNICATION DEVICE AND RELATED METHODS

TECHNICAL FIELD

The present invention relates to the field of communications and, more particularly to a serial protocol interface (SPI) for use in microcontrollers.

BACKGROUND

A serial protocol interface (SPI) is a standard communication interface supported by many microcontrollers and various other devices such as sensors and actuators, for example. The operational speed of SPI communications may be linked e.g., to specific on-chip implementation of the devices which communicate via the interface and to electrical characteristics of the board interconnections.

In this operational context, there is a need for improved approaches which may increase the communications speed regardless of e.g., specific physical delay, board interconnections and voltage/temperature conditions. Simplifying application development and offering added value features for users is also desirable for SPI communication.

SUMMARY

One or more embodiments may relate to a method of operating a serial protocol interface in a communication device configured to exchange data over a communication link by sending output data on the communication link, and receiving input data on the communication link. The input data is synchronous with a clock signal generated at the communication device and propagated over the communication link. The method includes initializing operation by sending the output data on the communication link at a first data rate, detecting a signal transition in the input data received on the communication link, and exchanging data over the communication link at a second data rate when the signal transition is detected. The second data rate is higher than the first data rate, with the exchanging of data at the second data rate synchronized as a function of the signal transition.

Another aspect is directed to a communication device that includes a synchronizer module configured to initialize device operation by sending output data on a communication link at a first data rate. The communication device also includes a transition detector configured to detect a signal transition in input data received on the communication link at the first data rate and, in response to detecting the signal transition, start exchanging data over the communication link at a second data rate that is higher than the first data rate. The exchanging of data at the second data rate is synchronized as a function of the signal transition.

BRIEF DESCRIPTION OF THE DRAWINGS

One or more embodiments will now be described, by way of example only, with reference to the annexed figures, in which.

DETAILED DESCRIPTION

In the ensuing description one or more specific details are illustrated, aimed at providing an in-depth understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

Figure 1:
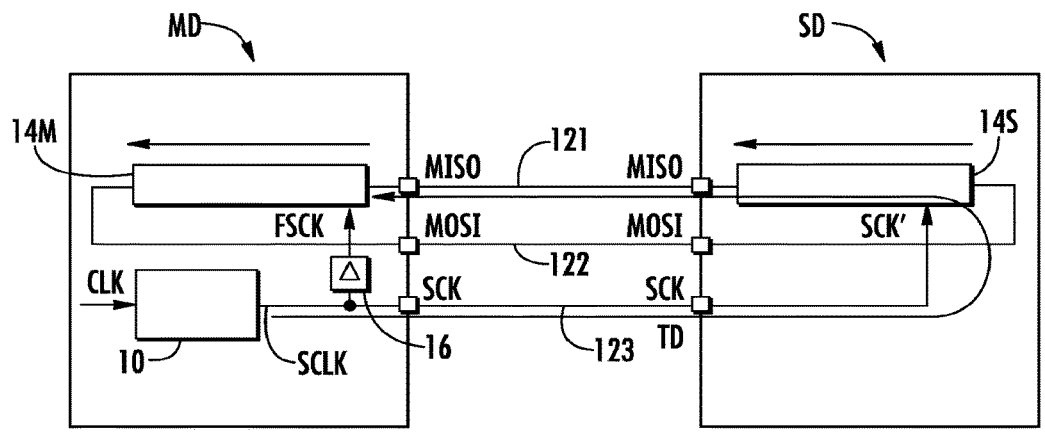
FIG. 1 is a block diagram of a communication device having a serial protocol interface (SPI)
Figure 2:
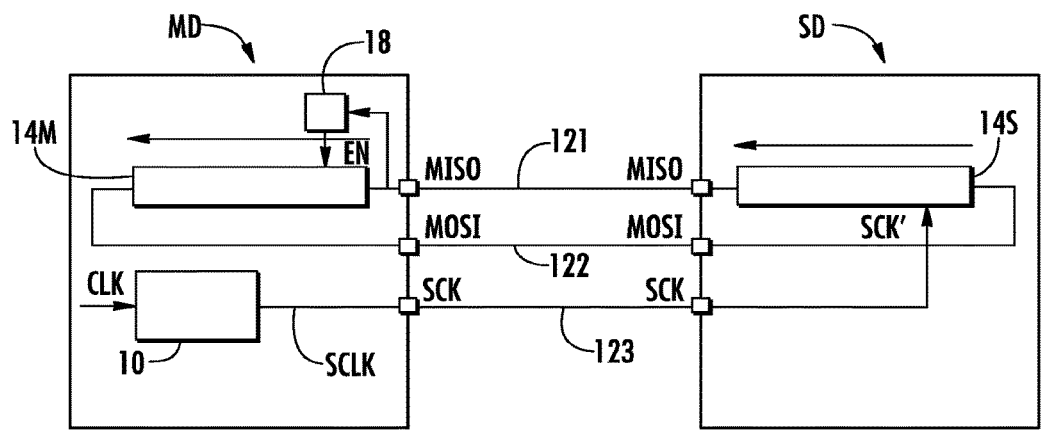
FIG. 2 exemplifies an alternative embodiment of the communication device of FIG. 1.

The diagrams of FIGS. 1 and 2 are exemplary of possible interfacing of a master device MD and a slave device SD in an electronic system such as e.g., a microcontroller.

Reference to a microcontroller as made herein is merely by way of example. The embodiments are not limited to such field of application and may in fact apply to any devices supporting a serial protocol interface.

In a simple configuration, a serial protocol interface (hereinafter, briefly SPI) may permit synchronous communication between the two devices MD and SD running with a clock signal generated by the master device MD, e.g., via an SPI clock generator 10, controlled via a clock control signal CLK.

In a configuration involving a single master device MD and a single slave device SD (one or more embodiments may in fact involve more devices, but reference will be made herein to two devices for the sake of simplicity) an SPI interface may involve a communication link including three "wires" 121, 122, namely, a line 121 to transfer Master Input Slave Output (MISO) data e.g. 1-bit of data from the slave device SD to the master device MD, a line 122 to transfer Master Output Slave Input (MOSI) data e.g. 1-bit of data from the master device MD to the slave device SD, and a line 123 by means of which a clock signal SCK generated at the master device MD may be sent to the slave device SD for use by the slave device SD e.g., to sample the data received.

Two shift registers 14M (at the master device MD) and 14S (at the slave device SD) may manage communication, e.g., so that at each SPI clock cycle (signal SCK) the MOSI data bits received by the slave device SD on the line 122 may be sampled and stored in the "slave" shift register 14S while, at the same time, the MISO data bits received by the master device MD on the line may be sampled and stored in the "master" shift register 14M.

In one or more embodiments, the SPI clock signal SCK as generated by the master device MD may then be used in the master device MD to sample the MISO data in the shift register 14M and drive a new data bit on the MOSI line 122, and routed (e.g., through a device pin) on the line 123 to be used in the slave device SD to sample the MOSI data in the shift register 14S and drive a new data bit on the MISO line 121.

The diagrams of FIGS. 1 and 2 are thus exemplary of operation of a serial protocol interface in a communication device (e.g., the master device MD) in exchanging data (e.g., MOSI, MISO) over a communication link, including e.g., the lines 121, 122, 123 wherein exchanging data by the device includes sending output data (e.g. MOSI) on the line 122 of the communication link and receiving input data (e.g., MISO) on the line 121 of the communication link, with the input data (e.g., MISO) synchronous with a clock signal SCK generated at the communication device MD and propagated over the line 123 of the communication link to the slave device SD.

In order to have enough margin for matching timing requirements (i.e., setup time and hold time of the shift register flops) at a suitable clock frequency, an inverted version of the SPI clock may be used either on the master side or on the slave side.

As schematically represented in FIG. 1 such a clock signal SCK as generated by the generator 10 may be sent from the master device MD over the line 123 to the slave device SD, and applied to the shift register 14M in the master device MD as a modified signal FSCK obtained via a delay element 16 so that e.g., FSCK and SCK have different polarities.

In the schematic representation of FIG. 1 the assumption is made that the clock signal as received at the master device MD is inverted with respect to the clock signal sent to the slave device SD so that the delay $\Delta$ is additional to that involved in inverting polarity. One may thus assume that the block 16 in FIG. 1 may include an NOT gate (either upstream or downstream of a delay element $\Delta$) with the purpose of provide polarity inversion.

Consequently, at least notionally, the following margins may be achieved half a clock cycle (half period) to propagate the clock signal to the slave device SD to sample the MOSI data, drive a new data on the MISO line 121 and propagate the new data over the MISO line 121 to the master, and half a clock cycle to propagate the new data over the MOSI line 122 before a new clock event occurs.

In such a scenario as depicted in FIG. 1, top communication speed (i.e., clock frequency) may depend on the delay experienced by the signals over the input/output circuits, pins and board interconnections.

Timing related to sampling the MISO signal may be critical. In fact, the "round trip" delay from the SPI clock generator 10 to the input of the master shift register 14M (Td in FIG. 1) should be less than half clock period, namely:

$Td<T/2+\Delta$ (where $\Delta$ is an extra delay on the internal clock).

In order to improve top clock frequency performance, the delay 16 as shown in FIG. 1 may be added on the clock branch connected to the master shift register 14M.

In that way, two margins may be associated to clock propagation: i) the one from the generator 10 to the shift register 14M through the delay element 16, and ii) the other from the clock generator 10 to the slave device SD over the line 123 and then back from the slave device SD to the master device MD via the line 121.

These margins were already discussed previously. In the case an "inverted" clock is used at the master side (or at the slave side) they both correspond to half a clock cycle, namely, half a clock cycle (half period) to propagate the clock signal to the slave device SD to sample the MOSI data, drive a new data on the MISO line 121 and propagate the new data over the MISO line 121 to the master, and half a clock cycle to propagate the new data over the MOSI line 122 before a new clock event occurs.

If a further delay $\Delta$ is added to the half-cycle delay already present on the clock signal as received by the shift register 14M on the master side, these margins become half a clock cycle plus $\Delta$ (half period +$\Delta$) to propagate the clock signal to the slave device SD to sample the MOSI data, drive a new data on the MISO line 121 and propagate the new data over the MISO line 121 to the master, half a clock cycle minus $\Delta$ (half period−$\Delta$) to propagate the new data over the MOSI line 122 before a new clock event occurs, and can be regarded as being increased and reduced, respectively, of the time $\Delta$.

Conditions may however occur where $\Delta$ is too large, so that the second margin is reduced too much, which may give rise to a timing violation at the slave device SD. Similarly, a timing violation may occur at the master device MD if the data received on the MISO line 121 are "too fast".

A correct delay may thus be dictated by the specific application (e.g., by the specific board interconnection delay, the slave device internal delay).

A sort of configurable delay mechanism may be desirable. However, this would imply e.g., a software procedure to write and read a pre-defined data sequence to/from the slave device SD with the purpose of finding out a judicious value for the delay $\Delta$.

It was noted that, apart from these drawbacks, such an approach would not solve the problem related to possible timing violations at the slave devices SD.

By way of direct comparison with FIG. 1, FIG. 2 exemplifies one or more embodiments where the delay element 16 may be dispensed with while a self-synchronization element 18 (which may be implemented e.g., in hardware form and possibly included in the master device MD) may be included to perform self-synchronization at the beginning of communication. Once self-synchronization is completed, e.g., in an initialization phase, communication may continue at a peak speed as allowed e.g., by the physical delay.

In one or more embodiments, such a self-synchronization mechanism may be transparent to the software running the system so that no specific attention will be paid to that point when developing an application.

In one or more embodiments as exemplified in FIG. 2, the master shift register 14M may be clocked with the same clock CLK used to generate a SPI clock signal in the generator 10. In one or more embodiments CLK may have a frequency twice the SPI clock SCLK.

In one or more embodiments, the self-synchronizer module 18 may be added and used to generate an enable signal EN for the shift register 14M.

In one or more embodiments, the data received on the MISO line 121 may then be written in the shift register 14M if the self-synchronizer module 18 generates a corresponding enable signal.

In one or more embodiments, the module 18 may manage the initialization phase and make it possible for the enable signal to be driven with a correct timing in a full-speed mode.

In one or more embodiments such an approach may be insensitive to any delay in the path including the SPI clock generator 10, the slave shift register 14S and the master shift register 14M, which may be more than one clock cycle.

Figure 3:
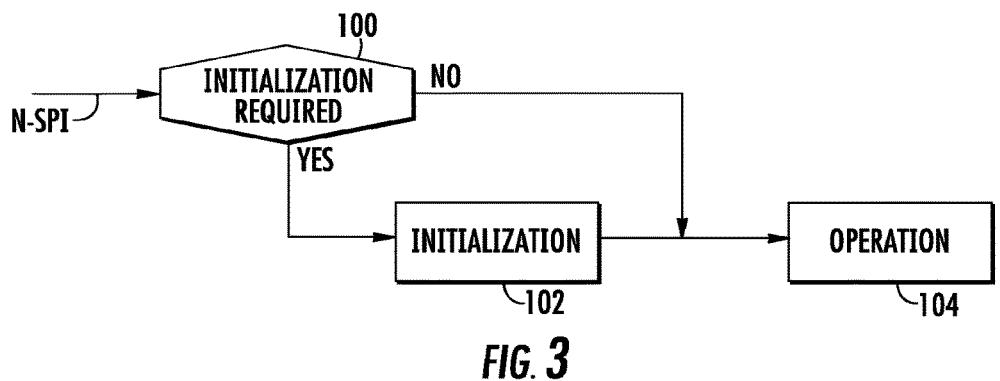
FIG. 3 is a simplified flow chart exemplary of SPI mode selection in one or more embodiments.

As a schematically represented in the flow chart of FIG. 3 initialization may be performed e.g., when a new SPI communication is started (as triggered by a signal N-SPI), after power on or if requested externally via software, by other device peripherals, for example.

In one or more embodiments, in a step 100 the module 18 may check if initialization is required and in the case of a positive outcome of the step 100 initialization may be performed in a step 102 (possibly while a few bits are transmitted at a reduced speed) to then switch to full speed operation 104 once initialization is completed. Such a condition may be reached directly from the step 100 if the check performed therein reveals that no initialization is required (negative outcome of the step 100).

In one or more embodiments, initialization may be performed at a reduced speed, e.g., with one bit of data every K clock cycles transferred until initialization is completed. After that, a full operation mode (step 104) may be automatically selected, with e.g., one bit of data transferred at every SPI clock cycle (i.e., 2 CLK cycles) according to standard SPI communication.

As better detailed in the following, in one or more embodiments, transferring one bit of data every K clock cycles transferred until initialization is completed may be achieved e.g., by generating on the clock line 123 a pulse at every K clock cycles.

In one or more embodiments, initialization may be completed after a transition from 0 to 1 is detected on the MISO line 121 (input line to the master device MD).

It will be appreciated that the choice of the transition used for detected may depend on the reset condition of the MISO line 121, so that a transition from 1 to 0 may be used in the place of the transition from 0 to 1.

In one or more embodiments, during initialization, data received on the MISO line 121 will not be lost and may be stored in the shift register 14M.

Figure 4:
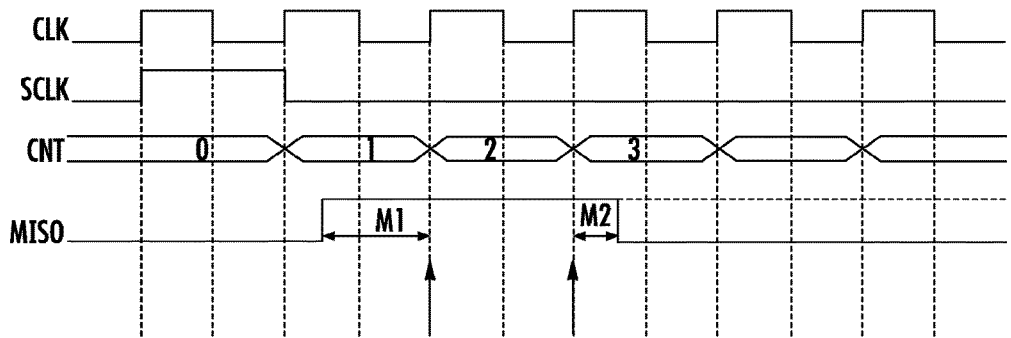
FIGS. 4 to 6 are chronograms exemplary of the operation of the communication device.
Figure 5:
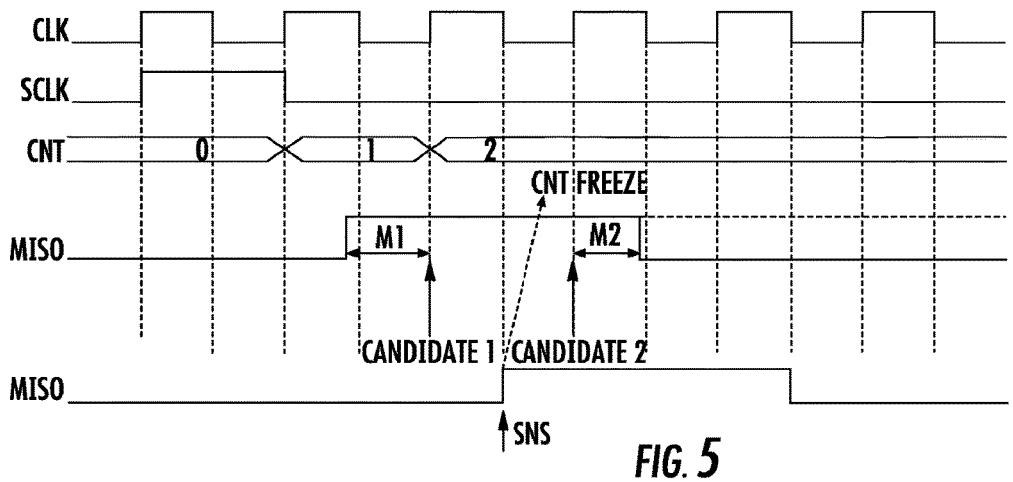
Figure 6:
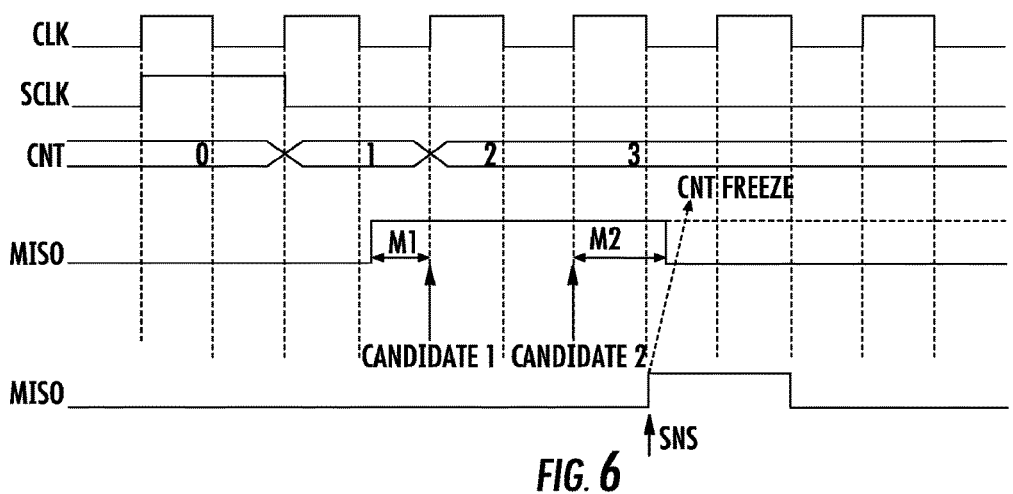

The principle of operation as considered in the foregoing is further exemplified in the diagrams of FIGS. 4 to 6.

These diagrams are essentially chronograms depicting, on a common time basis, the possible behavior of the clock signals CLK, SCLK, the MISO signal on the input line to the master device MD (the MISO signal being assumed to have an "on" time twice the cycle of the clock signal CLK) and a count signal CNT to be discussed in the following.

The examples refer for simplicity to operation in the case a single pulse of the SPI clock SCLK is generated.

In the exemplary representation in FIG. 4, the reset status of the MISO line 121 is 0; the data received on the MISO line 121 from the slave device SD as a consequence of the pulse generated on the SPI clock SCLK is "1"; since the MISO signal is driven by the slave device SD synchronously with the SPI clock SCLK, one may assume that the duration of data on the MISO 121 is equal to two internal clock cycles (this is the duration corresponding to full speed communication, e.g., assuming that the SPI clock SCLK is switched at a peak speed); and a counter CNT synchronous with the internal clock CLK is started at the same time at which the pulse is generated on the SPI clock.

The duration of the pulse on the MISO line 121 may thus be equal to two CLK cycles, so that two subsequent rising edges of the signal CLK may be used to sample the data. In the lowest diagram of FIG. 4, the instants corresponding to these edges are denoted as "candidate 1" and "candidate 2".

One of these rising edges may be preferable to the other, the better candidate being the one which provides the larger margin (that is the one farther away from the instance at which the MISO signal on the line 121 changes).

In the lowest diagram of FIG. 4, those margins may be denoted M1 (candidate 1) and M2 (candidate 2).

If one assumes that the distance between the candidates is one CLK cycle and the duration of MISO data is two CLK cycles, the sum of the two margins M1 and M2 is one CLK cycle Tclk, that is M1+M2=Tclk.

Consequently, the better candidate may correspond to a margin equal to half clock period or larger.

In the example presented in FIG. 4, the better candidate would be candidate 1 which corresponds to the count value CNT being equal to 1. The count which identifies the better candidate may be denoted Safe Sampling Time (SST).

The initialization step (102 in FIG. 3) may thus aim at automatically finding the better candidate, that is SST. Once identified, the SST value may be used as a delay for the internally generated SPI clock (that is the output SCLK of the SPI clock generator 10).

In one or more embodiments, a delayed version of the internally generated SPI clock may thus be used to drive the enable signal for the shift register 14M.

In one or more embodiments, a value for SST may be found by synchronizing the MISO signal by using the falling edges of the clock CLK (or, possibly, the rising edges of the inverted CLK signal).

An exemplary case based on such an approach is presented in FIGS. 5 and 6.

In FIG. 5 a brute force synchronization is assumed e.g., by cascading two D flip-flops (as better detailed in the following) so that synchronized MISO (denoted S_MISO@!CLK) may rise after two falling edges of the CLK signals.

The SST value may then be the count value at the instant at which the synchronized MISO rises, minus 1 (e.g., SST=CNT-1=1).

As exemplified in FIG. 5, the MISO signal may be asserted a little bit after the falling edge of CLK, so that M1 would be smaller that M2 and the synchronized MISO signal would be asserted 1 CLK cycle after that. This may cause the counter to be frozen one cycle later (e.g., SST=CNT-1=2).

The diagram of FIG. 6 shows a similar situation where the better candidate identified by "freezing" the counter signal CNT by a "snapshot" SNS of the synchronized MISO signal would be the second one instead of the first one.

In one or more embodiments, the SST value found as described in the foregoing will correspond to the better candidate. Uncertainty may arise when the MISO signal changes close to the falling edge of the CLK signal, so that the change may not be captured by the synchronizer module 18. Such a behavior may be acceptable insofar as in those conditions the two candidates (M1 and M2) will be more or less equivalent to each other.

It was similarly noted that the same principle may be extended to valid candidates corresponding to falling edges. In that way, four candidates may be identified with the best one corresponding to a margin notionally equal to one clock period or higher. In that case, two versions of the synchronized MISO signal may be generated, namely the former obtained by synchronization on the falling edges and the latter achieved by synchronization on the rising edges (as detailed in the following).

Figure 7:
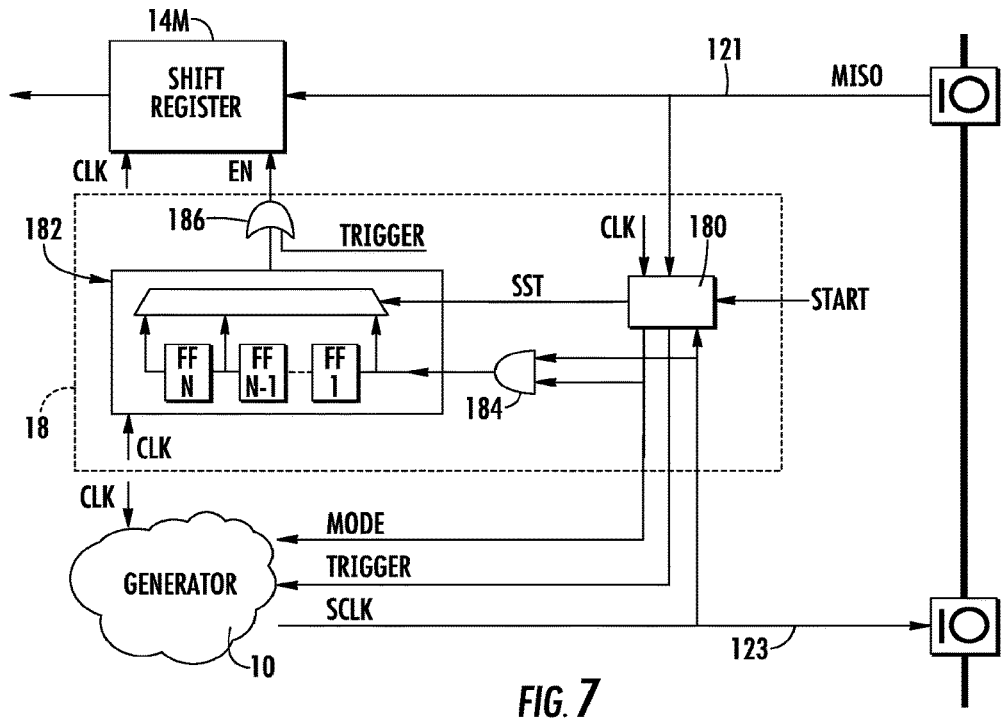
FIG. 7 is a block diagram of a synchronizer module of the communication device.

The block diagram of FIG. 7 is exemplary of a possible implementation of a self-synchronizer module 18 which generates an enable signal EN for the shift register 14M, while also managing SPI interface operation so that, after initialization, exchanging of data over the link (lines 121, 122) is synchronized as a function of the MISO transition detected during initialization.

In one or more embodiments, the module 18 may include an initializer sub-module 180 configured to drive a time shifter 182.

In one or more embodiments, the initializer 180 may be responsible for finding out the SST value as detailed in the foregoing.

In one or more embodiments as exemplified in FIG. 7, in addition to the clock signal CLK, the initializer 180 may be sensitive to the MISO signal on the line 121, the SCLK signal on the line 123 and a Start signal indicative that initialization may be required (see also the flow chart of FIG. 3).

The initializer 180 may then issue Mode and Trigger signals to the SP clock generator 10 as well the SST value to the time shifter 182.

An AND gate 184 may be provided to feed the time shifter 182 with the logical product of the Mode signal and the SCLK signal (so that the time shifter 182 may be fed with the SCLK signal when this type of operation is enabled by the Mode signal).

An OR gate 186 may generate the enable signal EN for the shift register 14M as the logical sum of a trigger signal and the output signal from the time shifter 182.

In one or more embodiments, the time shifter may include a set of cascaded flip-flops FF1, . . . FF$_N$ which is fed with the output from the AND gate 184 and driven (in terms of the number of flip-flops traversed by the signal being delayed) by the SST signal.

In one or more embodiments, the initializer 180 may also control switching from the initialization mode to the full mode of operation (via the Mode signal). When the initializer 180 receives the start command represented by the Start signal, initialization may be performed with the mode of operation driven e.g., to 0. Once initialization is completed the mode may be driven e.g., to 1.

In the full mode, the SPI clock generator 10 outputs an SP clock signal at the top speed.

Conversely, in one or more embodiments, during initialization, the initializer 180 may force generation of one pulse on the SPI clock every K cycles of CLK (where K is a parameter which may e.g., configured at design time or programmed in a register).

In one or more embodiments, such generation may be forced by means of the signal designated Trigger. When the Trigger signal is asserted, the SPI clock generator 10 may output one SPI clock pulse (which amounts to gating the SPI clock with the trigger signal). At the same time, the trigger signal may be used to enable the shift register 14M so that the data received on the MISO line 121 (e.g., as generated by the previous SPI clock pulse) are not lost.

When in the full mode, the time shifter 182 may be responsible for delaying all the SPI clock pulses of an amount equal to SST. As shown, such a task may be implemented by means of a chain of flip-flops whose length is defined as a function of the value of SST, with the output from the time shifter 182 used as enable signal for the shift register 14M.

Figure 8:
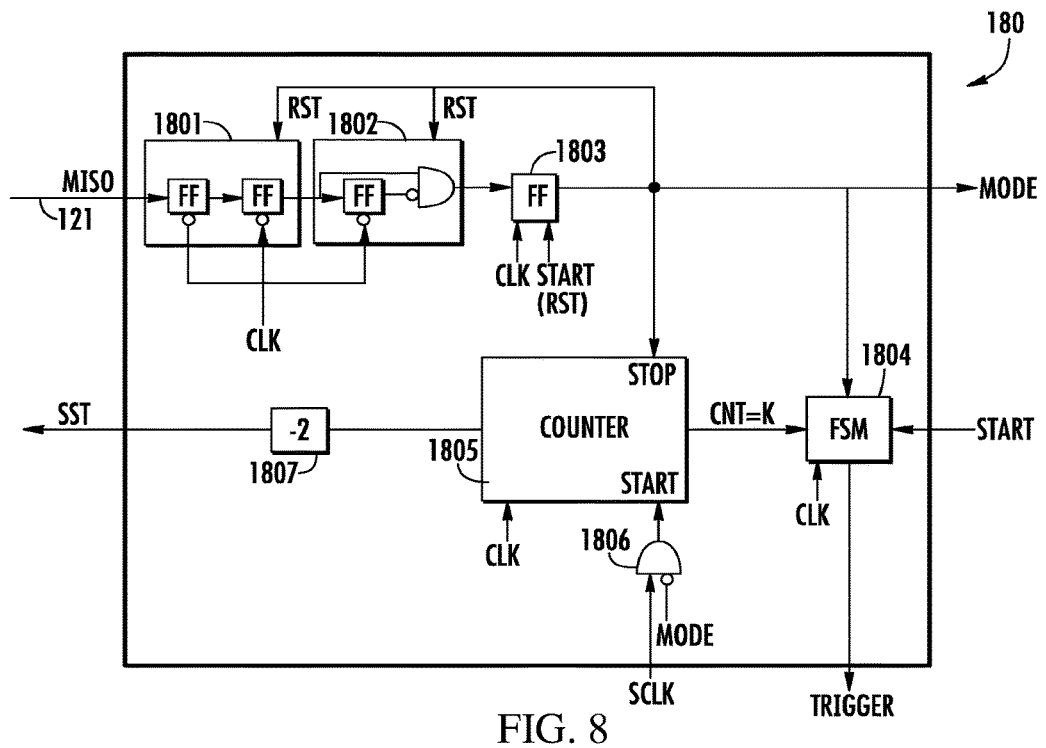
FIG. 8 is a block diagram of an initializer of the communication device.

The block diagram of FIG. 8 is exemplary of a possible implementation of the initializer 180.

In one or more embodiments, this may include a "brute force" synchronizer 1801 including two cascaded flip-flops acting e.g., on the falling edges of the signal CLK in order to generate a synchronized version of the MISO signal. This may be fed to a transition detector 1802 which may detect a transition (e.g., the transition from 0 to 1) of the synchronized MISO signal.

In one or more embodiments, the transition detector may include an AND gate which receives as one input, the output signal from the synchronizer 1801, and as the other input, a logically inverted version of the output from a flip-flop fed with the same output signal from the synchronizer 1801.

Both the synchronizer circuit 1801 and the transition detector 1802 may include a flip-flops clocked with the CLK signal.

The output from the transition detector 1802 may be used to drive the mode signal thus making it possible for the initialization mode to be forced as soon as the start signal is received. The Mode signal may be generated e.g., via a further flip-flop 1803 which receives the output from the transition detector 1802 and is clocked by the clock signal CLK while also being sensitive to the Start signal (rst), this signal being also sent to the synchronizer circuit 1801 and the transition detector 1802.

A finite state machine (FSM) 1804 (e.g., 1 bit FSM) may detect a Start command so that, as soon as such a Start signal is asserted, a counter 1805 (e.g., a ⅔ bit counter) may be started while an associated stop input is forced to 0 and the final state machine 1804 generates a pulse of the Trigger signal and on the counter 1805.

The counter may then reset and start to count as soon as a pulse of the internal SP clock is generated. This may be prompted by the output of an associated AND gate 1806 when this goes to "1" as a result of the logical product of the clock SCLK and the (logically inverted) Mode signal.

If a transition (e.g., from 0 to 1) is detected before a timeout defined as a function of the value K, the counter 1805 may stop, with the mode of operation switched to full and the SST value computed, e.g., by subtracting a fixed value 2 from the counter value, e.g., at 1807.

If after K cycles a transition (e.g., from 0 to 1) is not detected (CNT=K), the finite state machine 1804 receives the command to generate a new pulse on the trigger.

Without prejudice to the underlying principles, the details and embodiments may vary, even significantly, with respect to what has been described by way of example only, without departing from the extent of protection. The extent of protection is defined by the annexed claims.

The invention claimed is:

1. A method of operating a serial protocol interface in a communication device configured to exchange data over a communication link by sending output data on the communication link, and receiving input data on the communication link, the input data being synchronous with a clock signal generated at the communication device and propagated over the communication link, the method comprising:
   initializing operation by sending the output data on the communication link at a first data rate;
   detecting a signal transition in the input data received on the communication link;
   exchanging data over the communication link at a second data rate when the signal transition is detected, the second data rate being higher than the first data rate, with the exchanging of data at the second data rate synchronized as a function of the signal transition; and
   synchronizing a storing of the input data received on the communication link at the second data rate, wherein synchronizing the storing of the input data comprises delaying the input data received on the communication link at the second data rate as a function of the signal transition.

2. The method of claim 1, further comprising:
   selecting the first data rate as one bit of data every K clock cycles of the clock signal; and selecting the second data rate as one bit of data for each clock cycle of the clock signal.

3. The method of claim 1, further comprising storing the input data received on the communication link and contemporaneously exchanging data over the communication link at the first data rate.

4. The method of claim 1, further comprising:
detecting a plurality of candidate signal transitions in the input data received on the communication link at the first data rate; and
selecting a transition to start exchanging data over the communication link at the second data rate as one of the candidate transitions having a higher margin than either of a raising edge or a falling edge of the clock signal.

5. The method of claim 4, further comprising:
starting a count synchronous with the clock signal generated at the communication device;
stopping the count upon an occurrence of a transition in the input data received on the communication link after synchronization with the clock signal generated at the communication device; and
selecting the transition to start exchanging data over the communication link at the second data rate as a function of a value of the count when stopped.

6. The method of claim 1, wherein the communication device comprises a master device, and wherein initializing operation by sending the output data on the communication link at the first data rate comprises sending the output data on a master output slave input (MOSI) data line of the communication link to a slave device communicatively coupled to the master device.

7. The method of claim 6, wherein detecting the signal transition in the input data received on the communication link comprises detecting the signal transition on a master input slave output (MISO) data line of the communication link, the MISO data line being different from the MOSI data line.

8. The method of claim 6, wherein the clock signal is generated at the communication device and propagated over a clock signal line of the communication link, the clock signal line being different from the MOSI data line.

9. The method of claim 1, further comprising:
receiving an initial clock signal at the communication device; and
generating the clock signal from the initial clock signal, wherein a frequency of the clock signal is different from a frequency of the initial clock signal.

10. The method of claim 9, wherein the frequency of the initial clock signal is greater than the frequency of the initial clock signal.

11. A communication device comprising:
a synchronizer module configured to initialize a device operation by sending output data on a communication link at a first data rate;
a transition detector configured to detect a signal transition in input data received on the communication link at the first data rate and, in response to detecting the signal transition, start exchanging data over the communication link at a second data rate that is higher than the first data rate, the exchanging of data at the second data rate is synchronized as a function of the signal transition; and
a shift register configured to store the input data received on the communication link and contemporaneously exchanging data over the communication link at the first data rate, wherein the shift register is configured to synchronize storing of the input data by delaying the input data received on the communication link at the second data rate as a function of the signal transition.

12. The communication device of claim 11, wherein the synchronizer module is configured to select the first data rate as one bit of data every K clock cycles of a clock signal, and select the second data rate as one bit of data for each clock cycle of the clock signal.

13. The communication device of claim 12, wherein the transition detector is configured to select a transition to start exchanging data over the communication link at the second data rate as one of the candidate transitions having a higher margin than either of a raising edge or a falling edge of the clock signal.

14. The communication device of claim 11, wherein the transition detector is configured to detect a plurality of candidate signal transitions in the input data received on the communication link at the first data rate.

15. The communication device of claim 11, wherein the communication device comprises a master device, and wherein the synchronizer module is configured to initialize the device operation by sending the output data on a master output slave input (MOSI) data line of the communication link to a slave device communicatively coupled to the master device.

16. The communication device of claim 15, wherein the transition detector is configured to detect the signal transition on a master input slave output (MISO) data line of the communication link, the MISO data line being different from the MOSI data line.

17. A communication system comprising:
a first communication device;
a complementary communication device configured to receive output data at a first data rate from the first communication device, and send input data to the first communication device synchronous with a clock signal generated at the first communication device at a second data rate that is higher than the first data rate;
a communication link configured to exchange the input and output data between the first communication device and the complementary communication device; and
a shift register configured to store the input data received on the communication link and contemporaneously exchanging data over the communication link at the first data rate, wherein the shift register is configured to synchronize storing of the input data by delaying the input data received on the communication link at the second data rate as a function of the signal transition.

18. The communication system of claim 17, wherein the complementary communication device is configured to select the first data rate as one bit of data every K clock cycles of the clock signal, and select the second data rate as one bit of data for each clock cycle of the clock signal.

19. The communication system of claim 17, wherein the complementary communication device is configured to detect a plurality of candidate signal transitions in the input data received on the communication link at the first data rate.

20. The communication system of claim 17, wherein the complementary communication device is configured to select a transition to start exchanging data over the communication link at the second data rate as one of the candidate transitions having a higher margin than either of a raising edge or a falling edge of the clock signal.

* * * * *